United States Patent [19]

Longrigg

[11] Patent Number: 4,651,017
[45] Date of Patent: Mar. 17, 1987

[54] WIND ENERGY CONVERSION SYSTEM

[75] Inventor: Paul Longrigg, Golden, Colo.

[73] Assignee: The United States of America as represented by the United States Department of Energy, Washington, D.C.

[21] Appl. No.: 699,877

[22] Filed: Feb. 8, 1985

[51] Int. Cl.$^4$ .............................................. F03D 7/02
[52] U.S. Cl. ...................................... 290/44; 290/55; 33/DIG. 21
[58] Field of Search .............. 290/44, 55; 33/DIG. 21

[56] References Cited

U.S. PATENT DOCUMENTS

| | | | |
|---|---|---|---|
| 4,228,361 | 10/1980 | Jacobs et al. | 290/44 |
| 4,331,881 | 5/1982 | Soderholm et al. | 290/44 |
| 4,464,579 | 8/1984 | Schwarz | 290/44 |
| 4,525,633 | 6/1985 | Wertheim et al. | 290/44 |

Primary Examiner—William M. Shoop, Jr.
Assistant Examiner—W. E. Duncanson, Jr.
Attorney, Agent, or Firm—Kenneth L. Richardson; John M. Albrecht; Judson R. Hightower

[57] ABSTRACT

The wind energy conversion system includes a wind machine having a propeller connected to a generator of electric power, the propeller rotating the generator in response to force of an incident wind. The generator converts the power of the wind to electric power for use by an electric load. Circuitry for varying the duty factor of the generator output power is connected between the generator and the load to thereby alter a loading of the generator and the propeller by the electric load. Wind speed is sensed electro-optically to provide data of wind speed upwind of the propeller, to thereby permit tip speed ratio circuitry to operate the power control circuitry and thereby optimize the tip speed ratio by varying the loading of the propeller. Accordingly, the efficiency of the wind energy conversion system is maximized.

16 Claims, 2 Drawing Figures

WIND ENERGY CONVERSION SYSTEM

CONTRACTUAL ORIGIN OF THE INVENTION

The United States Government has rights in this invention under Contract No. DE-AC02-83CH10093 between the U.S. Department of Energy and the Solar Energy Research Institute, a Division of Midwest Research Institute.

BACKGROUND OF THE INVENTION

1. FIELD OF THE INVENTION

The present invention relates to wind energy conversion systems, and more particularly to a control system for a wind machine that incorporates a laser Doppler anemometer to sense wind gusts.

2. DESCRIPTION OF THE PRIOR ART

It is well known to use a wind mill or wind machine for the conversion of wind energy to electrical energy. One known construction for such a wind machine includes a relatively large propeller having a shaft that is mechanically coupled to the shaft of an electric generator. Wind incident upon the propeller interacts aerodynamically with the propeller blades to impart forces thereon that rotate the propeller shaft and the generator shaft.

Generally the efficiency of a wind energy conversion machine is dependent upon the ratio of the speed of the wind to the tip speed of the propeller blade which is based on the radius of the blade and the angular rotation of the propeller. The rotational speed of the propeller is dependent upon both the wind speed and the magnitude of the electrical load powered by the generator.

As is also well-known an electrical load imparts a torque which counteracts the torque induced by the wind. Thus, the load torque of the generator tends to slow down the propeller rotation, while the wind torque tends to increase the rate of movement of the propeller. Consequently, the rate of rotation of the propeller can be varied for a given wind speed by altering the electrical load on the generator. Such control of the propeller rotation rate and accordingly the speed of the propeller blade tip permits adjustment of the tip speed ratio for improved efficiency of the wind energy conversion process.

A common problem arising in the use of wind machines is the unpredictable variations of wind speed that result in corresponding variations in the tip speed ratio. This problem is of particular concern in the case of wind gusts wherein the wind speed changes far more rapidly than the propeller can change its rotational speed. As a result, the efficiency of the wind energy conversion process usually decreases when there are variable wind speeds and is significantly affected by wind gusts.

One method of dealing with the problem of variable wind speed and wind gusts is to employ mechanical anemometers upwind of the wind machine to measure the wind intensity. Such measurements provide advance information about wind speed which can then be utilized to alter the electrical load on the generator so as to optimize the tip speed ratio.

However, it has been found that the wind receptor cups of mechanical anemometers have significant inertia which retards the transmission of the wind speed information. Such delay hampers the ability to accurately control the tip speed ratio.

A further drawback in the use of mechanical anemometers is that such anemometers measure wind speed only at the site of the anemometer. Since wind speed measurements can vary markedly from point to point, the wind speed data obtained by use of a single mechanical anemometer may be inadequate and may not properly describe the wind condition which will be experienced by the propeller of the wind machine. Thus a mechanical anemometer does not adequately provide the information needed to attain optimum control of the tip speed ratio.

SUMMARY OF THE INVENTION

Against the foregoing background it is therefore a general object of the invention to provide a novel, high efficiency wind energy conversion system.

It is another general object of the invention to effectively control the propeller tip speed of a wind machine in response to sensed wind speed without the disadvantages inherent in mechanical anemometers.

It is a more specific object of the invention to control the propeller tip speed of the wind machine by varying the electrical load of a generator connected to the propeller in response to wind speed data obtained by laser Doppler measurement of wind speed.

Additional objects, advantages and novel features of the invention shall be set forth in part in the description that follows, and in part will become apparent to those skilled in the art upon examination of the following, or may be learned by the practice of the invention. The objects and the advantages of the invention may be realized and attained by means of the instrumentalities and combinations particularly pointed out in the appended claims.

To achieve the foregoing and other objects, and in accordance with the purpose of the present invention, as embodied and broadly described herein, the wind energy conversion system comprises a propeller rotatable by the force of wind, and an electrical generator mechanically coupled to the propeller. The generator serves to convert the power of the wind to electric power for use by an electric load. Circuitry for varying the power applied to the load is coupled between the generator and the load, the circuitry permitting adjustment of the loading of the generator to attain a desired ratio of wind speed to the tip speed of the propeller blade. Also included in the invention is an electro-optic subsystem for sensing the wind speed at various locations upwind of the propeller, an output of the subsystem being used to operate the circuitry for varying the loading on the generator. The response time of the electro-optic sensing is significantly faster than that associated with mechanical anemometers so as to provide the capability of maintaining a desired tip speed ratio even in the presence of gusty winds.

BRIEF DESCRIPTION OF THE DRAWINGS

The accompanying drawings of the wind energy conversion system which are incorporated in and form a part of the specification illustrate a preferred embodiment of the present invention, and together with the description, serve to explain the principles of the invention. In the drawings.

Corresponding reference characters indicate corresponding parts throughout the several views of the drawings.

DETAILED DESCRIPTION OF THE PREFERRED EMBODIMENT

Figure 1:
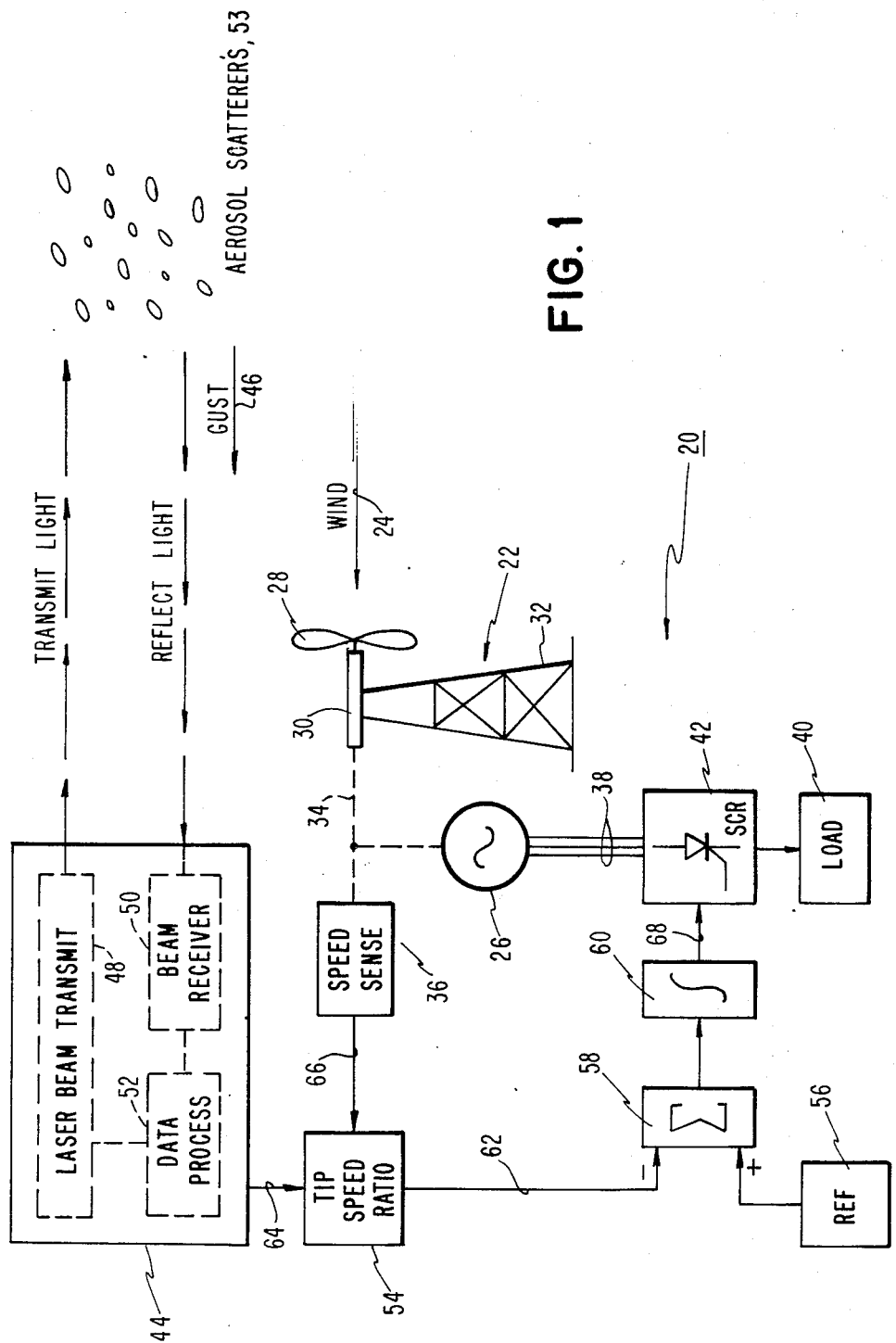
FIG. 1 is a block diagram of a wind energy conversion system with electro-optic sensing of wind speed for control of the tip speed ratio that incorporates one embodiment of the invention; and, FIG. 2 is a block diagram of a wind measuring subsystem thereof comprising laser beam transmission and reception equipment, and digital storage and correlation circuitry for measurement of Doppler frequency shift associated with moving particles in air.

A wind energy conversion system incorporating a preferred embodiment of the invention is generally indicated by the reference number 20 in FIG. 1.

The wind energy conversion system 20 includes a wind mill or machine 22 which interacts with the wind, indicated by an arrow 24, for driving an electric generator 26. The wind machine 22 is shown in stylized view, and includes a propeller 28 mounted on a propeller shaft 30 set on top of a tower 32. The shaft 30 is mechanically coupled, via dashed line 34, to the generator 26, as well as to a sensor 36 of the angular velocity of the shaft 30. The generator 26, which may be an alternator providing three-phase current via wires 38, connects with a load 40 via power-control circuitry 42.

A wind measuring subsystem 44 is included within the energy conversion system 20 for sensing the presence of wind gusts, as indicated by the arrow 46, upwind of the machine 22. The subsystem 44 provides a measure of the wind speed associated with such gusts and, with reference to FIG. 2, includes a laser beam transmitter 48, a laser beam receiver 50 and a digital data processor 52.

The processor 52 is coupled to the transmitter 48 and the receiver 50 for the extraction of wind speed data associated with the Doppler frequency shift imparted to a laser beam by moving particle aerosols 53 in the gusting air upwind of the machine 22, the aerosols 53 acting as scatterers.

The system 20 further comprises electrical circuitry 54 for the determination of the actual tip speed ratio, an adjustable source 56 of a reference voltage signal serving as a reference tip speed, a summing device 58 and an integrator 60. The tip speed circuitry 54 can include well-known circuitry, such as that found in a microprocessor, for the division of one electrical signal by a second electrical signal to provide an output electrical signal on the line 62 representing the ratio of the speed of the wind to the speed of the blade tip of the propeller 28.

In operation, the wind measuring subsystem 44 provides an output signal on the line 64 representing the measured speed of a wind gust 46 prior to the time when the gust 46 reaches the propeller 28. The shaft speed sensor 36, which can include a known shaft angle encoder or tachometer, provides an output electrical signal on line 66 which is proportional to the angular rate of rotation of the shaft 30 and the propeller 28, the signal on the line 66 also being proportional to the tangential speed of each blade tip of the propeller 28.

The ratio circuitry 54 devides the signal on the line 64 by the signal on the line 66 to provide a ratio signal via the line 62, which is coupled to a negative input terminal of the summing device 58. The reference signal of the source 56 is applied to a positive input terminal of the summing device 58. Thus the summing device 58 applies an error signal to the integrator 60, the error signal being a measure of the difference between a desired or reference value of the tip speed ratio and the anticipated ratio at the time the propeller 28 receives the wind gust 46.

The integrator 60 integrates the error signal of the summing device 58 in accordance with well-known principles of feedback control theory, to produce a drive signal on the line 68 for operating the power control circuitry 42. The circuitry 42 can include a known silicon control rectifier (SCR) circuit connected to each of the wires 38, the control terminal of each of the SCRs being driven by the drive signal on the line 68. The drive signal on the line 68 establishes the duty cycle in the extraction of alternating current from the wires 38 and hence, the average power delivered by the generator 26 via the circuitry 42 to the load 40.

It should be noted that the coupling of electric power from the generator 26 to the load 40 introduces a retarding torque which tends to slow down the rotational speed of the generator and, as a consequence, the rotational speed of the propeller shaft. Thus, the retarding torque of the generator 26 tends to counteract the torque induced on the propeller 28 by action of the wind impinging thereon.

It can also be appreciated that a reduction in the duty cycle of the output current of the generator 26 permits the propeller shaft 30 to speed up, while an increase in the duty cycle of the output current of the generator 26 causes a decrease in the speed of the propeller shaft 30. Consequently, variations in the magnitude of the drive signal on the line 68 can produce changes in the rotational speed of the shaft 30. In this manner, the drive signal is used to adjust the speed of the shaft 30 so as to provide the desired ratio between the wind speed and the tip speed of the propeller blades. A ratio of approximately unity is desirable in that it maximizes the efficiency of the conversion of the wind energy or power to the electric energy or power.

The response of the propeller 28 to a change in load torque accomplished by the power-control circuitry 42 depends on the inertia of the propeller 28, the generator 26 and the connecting mechanical apparatus. The integrator 60, which may be fabricated as a low pass filter slows down the response of the feedback loop configuration of the system 20. This slowdown takes into account the response time of the propeller 28, so as to ensure a controlled oscillation-free transition in propeller speed and the process of adjustment in the tip speed ratio. Such closed-loop speed control concepts are known and accordingly need not be described herein. The system 20 therefore adjusts the tip-speed ratio by alteration of the electrical load on the generator 26.

The correction of the tip speed ratio is based on the anticipated wind speed, as measured at a time and location prior to the arrival of a wind gust at the propeller 28. The prior knowledge of the wind speed is attained with the aid of the wind measuring subsystem 44 which operates by means of photoelectric circuitry including the laser transmitter 48 and the receiver 50.

Figure 2:
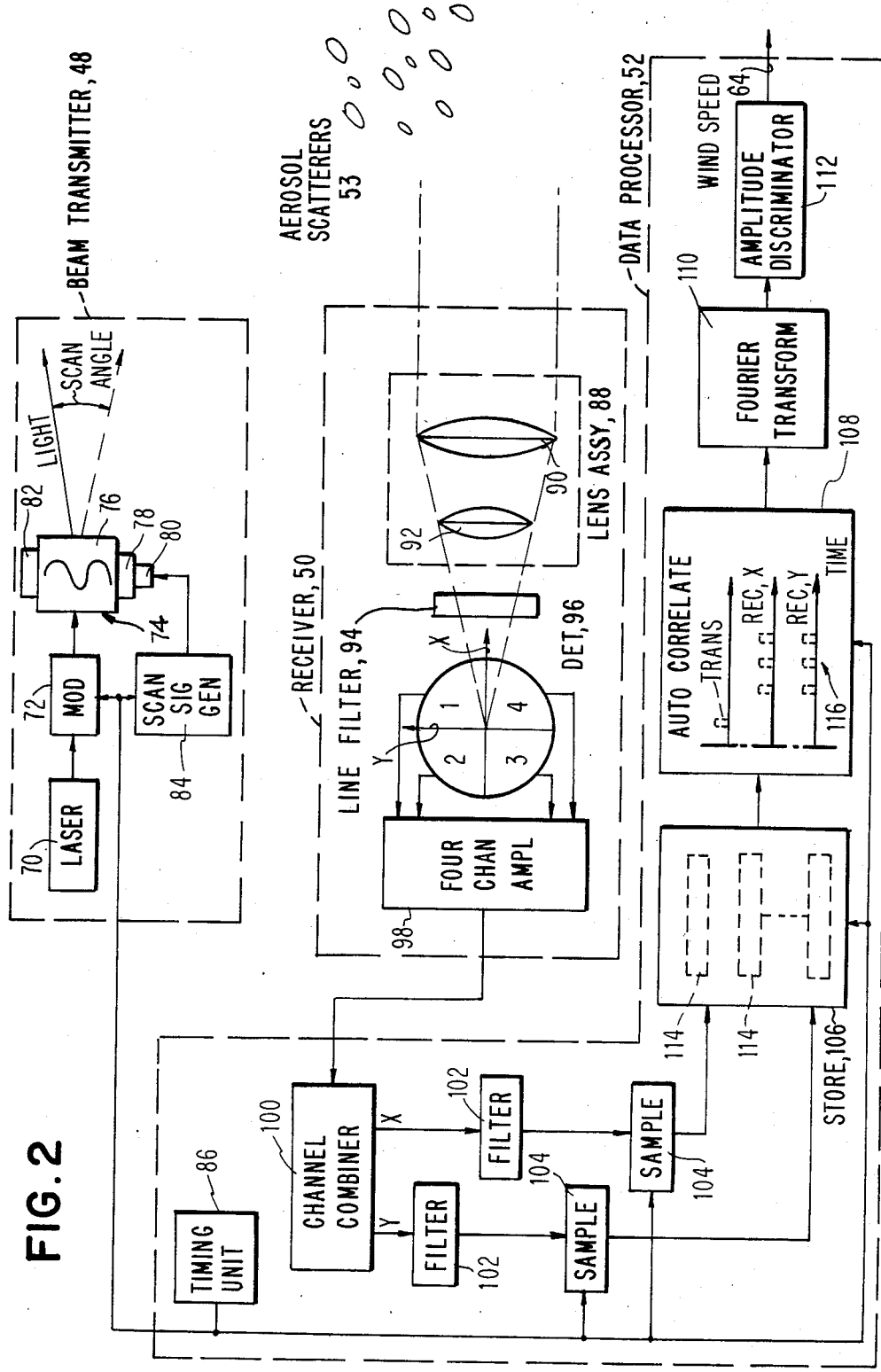

Referring now to FIG. 2, the details of the construction and operation of the subsystem 44 will now be described in connection with the laser transmitter 48, the laser receiver 50 and the data processor 52 previously described with reference to FIG. 1.

The laser beam transmitter 48 includes a laser 70, a modulator 72 for pulsing the beam of light from the laser 70, and a beam deflector 74 which deflects the pulsed beam of light from the modulator 72 over a predetermined scan angle.

The light exiting the beam deflector 74 is directed to the region of the aerosols 53. The beam deflector 74 can include an oscillating mirror (not shown), but preferably comprises an acousto-optic Bragg cell 76 driven by a piezoelectric transducer 78 activated by a radio frequency (RF) driver 80. The transducer 78 is located at one end of the cell 76 and a sonic absorber 82 is located at the opposite end of the cell 76. Acoustic waves are generated within the transparent material of the cell 76 and are absorbed by the absorber 82.

Interaction of the light wave from the laser 70 with the acoustic wave from the transducer 78 results in a known deflection of the light beam. A generator 84 applies an RF signal to the driver 80, the RF signal being of suitable frequency for deflecting the light beam in a desired direction. A timing unit 86 in the data processor 52 provides timing signals for synchronizing the operations of the generator 84 and the modulator 72 with operation of the processor 52.

The beam receiver 50 comprises a lens assembly 88 having a field lens 90 and an objective lens 92, a line filter 94 and a four-quadrant detector 96. Light from the laser 70 impinges upon the aerosols 53 and is reflected back to the lens assembly 88, which directs the received light through the filter 94 to focus upon the detector 96.

The lens assembly 88 passes light at the original frequency of the laser 70, as well as light which has been shifted in frequency by a Doppler frequency shift associated with motion of the aerosols 53. While there is a measure of random movement associated with the aerosols 53, there is also a bulk movement associated with air movement or wind. Accordingly, the Doppler shift contains data as to the wind speed.

The region of focus of the received light upon the detector 96 varies in accordance with the region of the air illuminated by the scanned beam from the deflector 74. The scanning beam illuminates a much larger region of space than would a stationary beam, and thereby provides speed data from a much larger region of space than could be provided by a single mechanical anemometer. The location of the region of focus of the received light on the detector 96 corresponds to the region of space which has been illuminated by the scanned beam from the deflector 74.

The four quadrants of the detector 96 are numbered 1, 2, 3, and 4, each of the quadrants being connected to corresponding channels of a four-channel amplifier 98. The detector 96 has x and y axes superimposed to identify a two-dimensional display of data from the scanned region. The detector 96 and the amplifier 98 can include a known photo-electron emissive material and a set of photo multipliers (not shown) whereby a set of four output signals are obtained corresponding to the illumination of each of the four quadrants The output signals of the amplifier 98 are applied to a channel combiner 100 of the data processor 52.

The line filter 94 is of known construction and filters out or attenuates optical energy at the transmission frequency of the laser 70. In the absence of any Doppler shift, a minimum intensity of light is received at the detector 96 because substantially all of the optical energy is filtered out by the filter 94.

The optical configuration of the laser beam receiver 50 mitigates the effects of received beam wander induced by atmospheric variations in the refractive index due to temperature gradients in the air.

In the presence of Doppler shift, the energy associated with the optical spectrum of the shifted frequencies passes through the filter 94 to impinge upon the detector 96. Consequently, the four output signals of the amplifier 98 provide information both as to the location of sources of Doppler frequency shift as well as the amount of such shift. In addition, the use of the filter 94 prevents overloading of the detector 96 and the amplifier 98 so as to permit these components to be adjusted for a maximum sensitivity at the anticipated Doppler frequencies.

The data processor 52 combines the aforementioned timing unit 86 and the channel combiner 100, and further includes a pair of filters 102 and a pair of signal samplers 104 connected to output channels of the combiner 100. Also included within the data processor 52 are a storage unit 106, a correlator 108, a Fourier transformer 110 and a discriminator 112. The samplers 104, the storage unit 106 and the correlator 108 are operated by clock signals of a clock (not shown) within the timing unit 86.

In operation, the combiner 100 sums together the quadrant signals of the right and the left sides of the detector 96 and outputs there difference as the output x channel signal. Similarly, the combiner 100 sums together the signals of the upper and lower quadrants of the detector 96, and outputs there difference as the y channel signal. The filters 102 filter the x and y output signals of the combiner 100, the filters 102 being bandpass filters which limit the spectrum of the received signals to the band of interest, thereby improving the signal-to-noise ratio. The samplers 104 provide digital sampling of the x and y channel signals from the filters 102, the digital samples being stored in sections 114 of the memory 106.

As portrayed in a graph 116 in the block of the correlator 108, a succession of samples of the Doppler shifted signal is taken by each of the samplers 104. These samples are then correlated against themselves, an autocorrelation by the correlator 108 to produce an output correlation function containing the desired wind speed data. The correlation may be done separately for the x and the y channels, and may also be done as a cross correlation between the x and the y channels.

The extraction of Doppler data by means of the correlation operation is described in the article "Measurement of Cross Wind Velocity", by F. Durst et al., Applied Optics, Vol. 21, No. 14, July 15, 1982, pages 2596-2607.

The spectral components of the correlation functions are obtained by the transformer 110 which may be implemented as a well-known fast-Fourier transformation. An amplitude discriminator 112 selects the frequency components having the largest amplitudes as being representative of the wind speed. The amplitude of the wind speed appears as an output signal of the discriminator 112 on the line 64 to be applied to the circuitry 54 (FIG. 1) for calculation of the tip speed ratio.

In the selection of samples for the correlation, it may be desirable to use only those samples appearing within a preselected time interval after the transmission of a pulse of laser light. Such a selection of samples provides the function of range gating for measurement of wind speed at a preselected range from the propeller 28. As a practical matter, in the implementation of the data processor 52, the functions of the correlator 108, the transmitter 110, and the discriminator 112 can readily be attained by use of a microprocessor which is suitably programmed to provide the foregoing functions.

Numerous programs for correlation, Fourier transformation and selection of signals based on amplitude are available for use with commercially available microprocessors.

By means of the foregoing system, the loading of a wind operated electrical generator can be altered in accordance with information of future wind speed, the information being obtained before a gust of wind reaches the propeller of a wind machine. Such alteration of the loading of the generator, and thus of the propeller itself, permits adjustment of the tip speed ratio of the propeller blades so as to operate the wind machine efficiently by adapting the speed of the propeller to match the wind speed. Thereby, there is a more efficient conversion of wind energy to electrical energy.

The use of electro-optic Doppler measurement techniques of a volume of air upwind of the wind machine, in combination with data processing of received Doppler signal echoes permits a rapid measurement of the wind speed. The rapidity of measurement permits adjustment of the electrical loading to be accomplished before any wind gust reaches the propeller. Also the employment of electro-optic scanning of the laser beam permits the gathering of data over a much larger area of space than can be obtained by mechanical anemometers.

The foregoing is considered as illustrative only of the principles of the invention. Further, since numerous modifications and changes will readily occur to those skilled in the art, it is not desirable to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. A wind energy conversion system comprising a propeller rotatable by force of wind, a generator of electricity mechanically coupled to said propeller for converting power of the wind to electric power for use by an electric load, means coupled between said generator and the electric load for varying the electric power drawn by the electric load to alter the electric loading of said generator, means for electro-optically sensing the speed of the wind at a location upwind from said propeller and means coupled between said sensing means and said power varying means for operating said power varying means to adjust the electric load of said generator in accordance with a sensed value of wind speed to thereby obtain a desired ratio of wind speed to the speed of a tip of a blade of said propeller.

2. The system as claimed in claim 1, wherein said sensing means comprises a laser for transmission of a beam of light upwind of said propeller, a receiver of laser light reflected from aerosols in a region of space upwind of said propeller and means for scanning a beam of the laser light through said region of space for gathering wind data throughout said region of space.

3. The system as claimed in claim 2, wherein said scanning means comprises an acousto-optic cell providing electronic scanning of the laser beam over a predetermined region of space.

4. The system as claimed in claim 2, wherein said sensing means comprises data processing means coupled between said receiver and said scanning means and including means for correlating a succession of echoes with each other to obtain wind data.

5. The system as claimed in claim 4, wherein said data processing means further comprises means for spectrally analyzing correlation functions of Doppler return signals provided by said correlating means.

6. The system as claimed in claim 2, wherein said sensing means includes data processing means coupled between said receiver and said scanning means for extraction of wind data from received optical signals, said data processing means including means for storing samples of return signals, and a microprocessor for calculating instantaneous velocity of aerosols suspended in the air upwind of said propeller.

7. The system as claimed in claim 6, wherein said operating means include means for sensing a speed of rotation of said propeller and means coupled to said propeller-speed sensing means and to an output terminal of said data processing means for calculating a ratio of wind speed to the speed of the tip of a blade of said propeller.

8. The system as claimed in claim 2, wherein said receiver of laser light includes a four quadrant detector and a lens assembly for eliminating atmospherically induced effects of beam wander.

9. A wind energy conversion system comprising a propeller rotatable by a force of wind, a generator of electricity mechanically coupled to said propeller for converting power of said wind to electric power for use by an electric load, means coupled between said generator and the electric load for varying a duty cycle of electric power coupled from said generator to the electric load to thereby alter the loading of the generator and the propeller by the electric load, means for transmitting a laser beam upwind of said propeller to gather wind speed data from a predetermined region of space, means for receiving laser light reflected from aerosols carried by air in said predetermined region of space, data processing means coupled between said transmitting means and said receiving means for extracting wind data from received echoes of light impinging upon said receiving means and means coupled between said data processing means and said power varying means for operating said power varying means to adjust an electric loading of said generator in accordance with wind speed data to thereby attain a desired ratio of wind speed to the speed of the tip of a blade of said propeller.

10. The system as claimed in claim 9, wherein said operating means includes means for sensing a speed of rotation of said propeller, and means coupled to an output terminal of said data processing means for forming a ratio of wind speed provided by said data processing means to the tangential speed of a tip of a blade of said propeller.

11. The system as claimed in claim 10, wherein said operating means further comprises means for comparing the speed ratio provided by said ratio forming means to a reference ratio value to thereby conform an actual ratio of speed to a desired ratio of wind speed to blade tip speed.

12. The system as claimed in claim 11, wherein said transmitting means includes means for pulsing a laser beam, and means for electronically scanning a laser beam through said predetermined region of space.

13. The system as claimed in claim 12, wherein said data processing means include means for sampling optical echoes reflected from aerosols in said predetermined region of space, means for storing a succession of samples of the echoes, and means for correlating stored samples of the echoes with each other to extract wind data.

14. The system as claimed in claim 13, wherein said receiving means includes a filter for attenuating a transmission frequency of light transmitted by said transmitting means.

15. The system as claimed in claim 14, further comprising timing means for synchronizing an operation of said transmitting means and an operation of said receiving means with an operation of said data processing means to thereby associate wind speed data with specific locations in said predetermined region of space.

16. The system as claimed in claim 9, wherein said means for receiving laser light includes a four quadrant detector and a lens assembly for eliminating atmospherically induced effects of beam wander.

* * * * *